US007115340B2

(12) United States Patent
Mori

(10) Patent No.: US 7,115,340 B2
(45) Date of Patent: *Oct. 3, 2006

(54) NON-AQUEOUS ELECTROLYTE SECONDARY BATTERY

(75) Inventor: Sumio Mori, Kyoto (JP)

(73) Assignee: GS Yuasa Corporation, Kyoto (JP)

( * ) Notice: Subject to any disclaimer, the term of this patent is extended or adjusted under 35 U.S.C. 154(b) by 390 days.

This patent is subject to a terminal disclaimer.

(21) Appl. No.: 10/326,443

(22) Filed: Dec. 23, 2002

(65) Prior Publication Data

US 2003/0148191 A1 Aug. 7, 2003

(30) Foreign Application Priority Data

Dec. 26, 2001 (JP) .............................. 2001-393909

(51) Int. Cl.
*H01M 6/16* (2006.01)

(52) U.S. Cl. .................. 429/330; 429/331; 429/332; 429/340; 429/341; 429/199; 429/231.8; 29/623.1

(58) Field of Classification Search ................ 429/330, 429/331, 332, 340, 327, 329, 231.8, 341, 429/199; 29/623.1
See application file for complete search history.

(56) References Cited

U.S. PATENT DOCUMENTS 6,033,809 A * 3/2000 Hamamoto et al. ......... 429/340

2002/0037458 A1 3/2002 Yamaguchi et al.
2002/0039677 A1 4/2002 Iwamoto et al.
2004/0091786 A1* 5/2004 Unoki et al. ................ 429/331

FOREIGN PATENT DOCUMENTS

| EP | 1 030 399 | 8/2000 |
| JP | 10-189042 | 7/1998 |
| JP | 11-162511 | 6/1999 |
| JP | 2002-15768 | 1/2002 |

OTHER PUBLICATIONS

Han et al. "Theoretical studies of the solvent decomposition by lithium atoms in lithium-ion battery electrolyte" Chemical Physics Letters, 360 (Jul. 10, 2002), pp. 359-366.*

* cited by examiner

*Primary Examiner*—Laura Weiner
(74) *Attorney, Agent, or Firm*—Wenderoth, Lind & Ponack, L.L.P.

(57) ABSTRACT

A non-aqueous electrolyte secondary battery according to the present invention is characterized by including a non-aqueous electrolyte which contains at least one of vinylene carbonate derivatives at a concentration of 1 wt % or less and at least one of cyclic sulfates at a concentration of 2 wt % or less. According to the present invention, a non-aqueous electrolyte secondary battery having excellent discharge characteristics at a low temperature can be obtained.

16 Claims, 1 Drawing Sheet

NON-AQUEOUS ELECTROLYTE SECONDARY BATTERY

BACKGROUND OF THE INVENTION

1. Field of the Invention

The present invention relates to a non-aqueous electrolyte secondary battery.

2. Description of the Prior Art

In recent years, as commercial cell phones, portable devices, personal digital assistances or the like have rapidly been diversified and reduced in size and weight, there is a strong need for development of a secondary battery as a power source thereof which is compact and lightweight and which also has a high energy density and can repeatedly charge and discharge over a long period of time. Specifically, a non-aqueous electrolyte secondary battery such as a lithium secondary battery has been studied intensively, because such secondary battery is excellent in terms of its size, weight and its high energy density over with a lead battery or a nickel cadmium battery which uses an aqueous electrolyte solution.

As a positive active material for the non-aqueous electrolyte secondary battery, various compounds have been investigated including titanium disulfide, vanadium pentoxide, and molybdenum trioxide, as well as other compounds having general formulae $Li_xMO_2$ (where M is one or more transition metals) such as lithium cobalt complex oxides, lithium nickel complex oxides, and spinel type of manganese oxides. Particularly, lithium cobalt complex oxides, lithium nickel complex oxides, or spinel type manganese oxides can achieve a battery which provides a high discharge voltage by using such oxides as a positive electrode, because charge and discharge are performed at a noble potential than 4V vs. $Li/Li^+$.

As a negative active material for the non-aqueous electrolyte secondary battery, various compounds have been investigated such as metallic lithium, lithium alloys, and carbon materials capable of intercalating and deintercalating lithium. Particularly, when using the carbon materials, there are some advantages that a battery having a long cycle life and a high level of safety can be obtained.

As an electrolyte for the non-aqueous electrolyte secondary battery, an electrolyte solution, produced by dissolving a supporting salt such as $LiPF_6$ or $LiBF_4$ in a mixed solvent including a solvent having a high dielectric constant such as ethylene carbonate or propylene carbonate and a solvent having a low viscosity such as dimethyl carbonate or diethyl carbonate, has generally been used.

The non-aqueous electrolyte secondary batteries are used in various circumstances. One of such circumstances is a cold climate. For example, a non-aqueous electrolyte secondary battery used for a cell phone is required to have excellent discharge characteristics even at a low temperature, since such cell phones may be used on skiing grounds or in mountains during a winter season.

The low temperature discharge characteristics are affected by various factors such as a current collecting property of the battery, an electric conductivity of the non-aqueous electrolyte, and a reactive resistance at positive and negative electrodes. Particularly in the case of a non-aqueous electrolyte secondary battery which generates a high voltage, components of the non-aqueous electrolyte are decomposed on a surface of an electrode, polymerized products which may cause a reduction in the electric conductivity of the electrolyte solution are produced, and a film having a low lithium ion conductivity is formed. Thus, the low temperature discharge characteristics of the non-aqueous electrolyte secondary battery have often been impaired.

As a method for preventing such decrease in the low temperature discharge characteristics induced by the decomposition of the components in the non-aqueous electrolyte, a small amount of additive is added to the non-aqueous electrolyte. For example, high temperature storage characteristics can be improved while also improving low temperature characteristics thereof by adding a small amount of vinylene carbonate to a non-aqueous electrolyte of the non-aqueous electrolyte secondary battery, as described in Japanese Patent Laid-Open No. 2002-15768. This method improves the low temperature discharge characteristics, but its effect becomes insufficient in these days because performance of the non-aqueous electrolyte secondary battery is required to be improved more than ever, so that a method for further improving the low temperature discharge characteristics has been desired.

In addition, a method of adding a cyclic sulfate to a non-aqueous solvent is described in Japanese Patent Laid-Open Nos. 10-189042and 11-162511. However, in such patent applications, there are no descriptions about additive amounts which are sufficient for improving the low temperature discharge characteristics, and also, there are no descriptions that it is possible to obtain especially excellent discharge characteristics at a low temperature by using a predetermined amount of vinylene carbonate mixed with the above described solvent.

SUMMARY OF THE INVENTION

The present invention has been achieved for the purpose of solving the above described problems, and an object of the present invention is to provide a non-aqueous electrolyte secondary battery which is excellent in its low temperature discharge characteristics.

The non-aqueous electrolyte secondary battery according to the present invention is characterized by comprising a non-aqueous electrolyte which contains at least one of vinylene carbonate derivatives at a concentration of 1 wt % or less and at least one of cyclic sulfates at a concentration of 2 wt % or less.

The vinylene carbonate derivative is a compound represented by Chemical Formula 1, where each of R1 and R2 is any one of a hydrogen atom, alkyl groups, alkoxy groups, halogens, haloalkyl groups, and aryl groups (which may form an unsaturated bond with any group thereof).

[Chemical Formula 1]

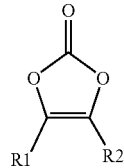

The cyclic sulfate is a compound represented by Chemical Formula 2, where each of R3 to R8 is any one of a hydrogen atom, alkyl groups, alkoxy groups, halogens, haloalkyl groups, and aryl groups (which may form an unsaturated bond with any group). Further, n in Chemical Formula 2 is 0 or 1, and the cyclic sulfate represented by Chemical Formula 2 is a 5- or 6-membered ring.

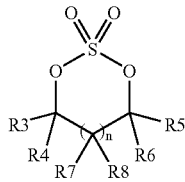

[Chemical Formula 2]

According to the present invention, a non-aqueous electrolyte secondary battery which is excellent in its low temperature discharge characteristics can be obtained.

DETAILED DESCRIPTION OF EMBODIMENTS

Figure 1:
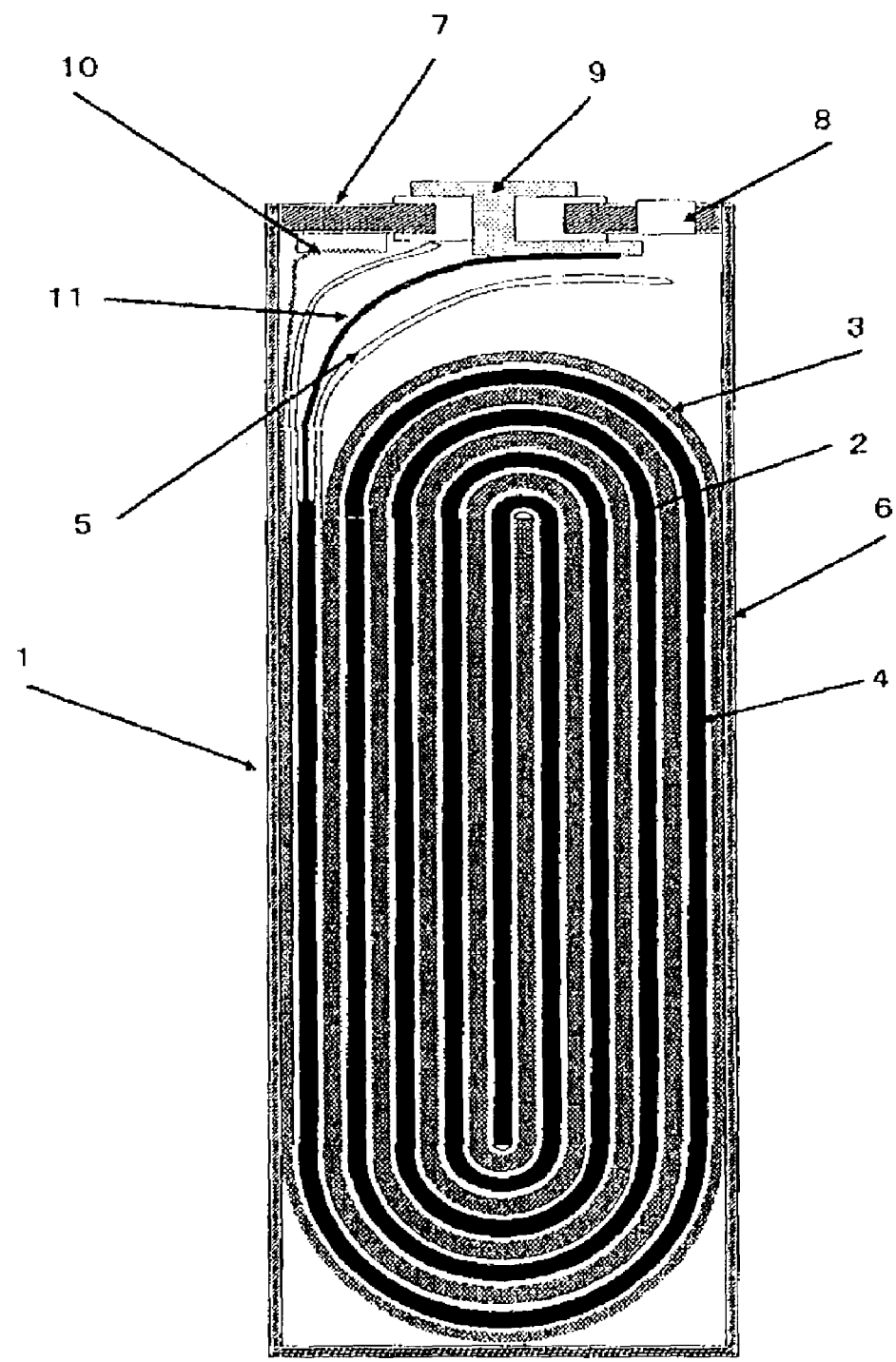
FIG. 1 is a cross sectional view showing a prismatic battery according to an example of the present invention compared with that of a comparative example.

As a result of making intensive studies for the purpose of resolving the above described problems of the prior art, the inventors of this application have found that especially excellent discharge characteristics at a low temperature can be obtained by adding a vinylene carbonate derivative and a cyclic sulfate to a non-aqueous electrolyte at a concentration within a certain range, and consequently, the inventors have now come into achieve the present invention.

Next, an embodiment of the present invention will be described.

A non-aqueous electrolyte secondary battery according to the present invention is characterized by comprising a non-aqueous electrolyte which contains at least one of vinylene carbonate derivatives at a concentration of 1 wt % or less and at least one of cyclic sulfates at a concentration of 2 wt % or less.

The vinylene carbonate derivative is a compound represented by Chemical Formula 1, where each of R1 and R2 is any one of a hydrogen atom, alkyl groups, alkoxy groups, halogens, haloalkyl groups, and aryl groups (which may form an unsaturated bond with any group thereof).

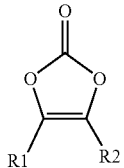

[Chemical Formula 1]

The cyclic sulfate is a compound represented by Chemical Formula 2, where each of R3 to R8 is any one of a hydrogen atom, alkyl groups, alkoxy groups, halogens, haloalkyl groups, and aryl groups (which may form an unsaturated bond with any group). Further, n in Chemical Formula 2 is 0 or 1, and the cyclic sulfate represented by Chemical Formula 2 is a 5- or 6-membered ring.

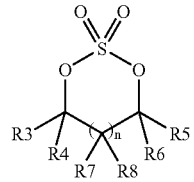

[Chemical Formula 2]

When a trace amount of one of the vinylene carbonate derivative and the cyclic sulfate is used alone, an SEI film favorable for a negative active material is formed and the low temperature discharge characteristics are slightly improved. However, addition of an increased amount of the derivative results in a thicker SEI film and consequently a lithium ion conductivity is lowered, so that the low temperature discharge characteristics are never improved largely. By contrast, the non-aqueous electrolyte secondary battery according to the present invention provides extremely excellent discharge characteristics at a low temperature by using the above described electrolyte. Although the reasons are not apparent, it is believed that a film over the negative active material obtained by mixing 1 wt % or less of vinylene carbonate derivative and 2 wt % or less of cyclic sulfate is different from a film obtained by using the derivative alone, so that decomposition of the non-aqueous electrolyte may be effectively suppressed and a film having a high lithium ion conductivity may be formed.

The SEI (Solid Electrolyte Interphase) refers to a passivation film formed on a surface of metallic lithium or a carbon material by reducing a solvent in an electrolyte when initial charge is performed on the metallic lithium or the carbon material within the non-aqueous electrolyte (Masaki Yoshio, Akiya Kozawa eds. "Lithium Ion Secondary Battery-materials and Practical Application", Nikkan Kogyo Shinbun LTD. (1996)). Then the SEI formed on the surface of the metallic lithium or the carbon material acts as a passivation film having a lithium ion conductivity to suppress a reaction between the metallic lithium or the carbon material and the solvent.

In the non-aqueous electrolyte secondary battery according to the present invention, a concentration of the vinylene carbonate derivative contained in the electrolyte largely decreases at the initial charge. For example, as described in Japanese Patent Laid-Open No. 2002-015768, when a concentration of a vinylene carbonate before introducing thereof is about 1.0 wt %, the concentration of the vinylene carbonate decreases to 487 ppm after the initial charge and discharge. In this manner, concentrations of the vinylenen carbonate which have initially been added at any amounts become lower after the initial charge and discharge. The cyclic sulfate is decomposed principally on a negative electrode during first charge. Therefore, it is considered that a concentration of the cyclic sulfate in the non-aqueous electrolyte after the initial charge and discharge becomes lower than that during introducing thereof. The concentrations of the vinylene carbonate derivative and the cyclic sulfate in the electrolyte are gradually decreased by repeatedly performing charges and discharges after the initial charge and discharge. The non-aqueous electrolyte secondary battery according to the present invention contains a vinylene carbonate derivative and a cyclic sulfate in the electrolyte at specified concentrations, at least at a certain time during a period from when the electrolyte is initially contacted with an electrode to when the electrolyte can not be added because the battery case is completely sealed.

EXAMPLES

Although specific examples to which the present invention is applied will now be described below, the present invention is not limited to the examples and it is possible to practice the present invention with making any alterations thereto as long as the scope and spirit of the present invention will not be changed.

FIG. 1 is a schematic cross sectional view of a prismatic non-aqueous electrolyte secondary battery according to the present invention.

The prismatic non-aqueous electrolyte secondary battery 1 comprises an electrode group 2 and a non-aqueous electrolyte solution both of which are contained within a battery case 6 having a width of 30 mm, a height of 48 mm, and a thickness of 4 mm. The electrode group 2 is in the form of a flattened roll comprising a positive electrode 3 made by coating a positive composite on an aluminum current collector and a negative electrode 4 made by coating a negative composite on the copper current collector between which a separator 5 is interposed.

A battery lid 7 equipped with a safety valve 8 is attached to the battery case 6 by laser welding, a negative electrode terminal 9 is connected to the negative electrode 4 via a lead plate of negative electrode 11, and the positive electrode 3 is connected to the battery lid via a lead plate of positive electrode 10.

The positive electrode was fabricated as follows: N-methyl pyrrolidone was added to a positive composite which was a mixture of 8 wt % of poly(vinylidene fluoride) as a binder, 5 wt % of acetylene black as a conductive agent, and 87 wt % of a positive active material being a lithium cobalt composite oxide to prepare a paste, then the paste was applied on both sides of the aluminum foil current collector having a thickness of 20 μm and dried.

The negative electrode was fabricated as follows: an appropriate amount of water was added to a mixture of 95 wt % of graphite, 2 wt % of carboxymethyl cellulose, and 3 wt % of styrene butadiene rubber to prepare a paste, then the paste was applied on both sides of the copper foil current collector having a thickness of 15 μm and dried.

As the separator, a polyethylene microporous membrane was used. And as the electrolyte solution, a non-aqueous electrolyte solution prepared as follows was used. That is, the electrolyte solution was prepared by dissolving 1 mol/L of $LiPF_6$ in a mixed solvent including ethylene carbonate (EC) and ethylmethyl carbonate (EMC) at a ratio of 3:7 (by volume), to which vinylene carbonate represented by Chemical Formula 3 was added to a concentration of 0.25 wt % relative to a total amount of the electrolyte solution and further ethylene glycol sulfate represented by Chemical Formula 4 was added to a concentration of 0.25 wt % relative to the total amount of the electrolyte solution. Using the above described constitutions and procedures, 12 non-aqueous electrolyte secondary batteries used for Example 1 were fabricated.

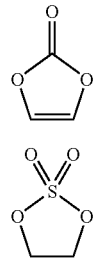

[Chemical Formula 3]

[Chemical Formula 4]

As to 54 kinds of batteries used for Examples 2 to 24 and Comparative Examples 1 to 31, 12 non-aqueous electrolyte secondary batteries were fabricated for each Examples and Comparative Examples as described above except that amounts of vinylene carbonate and ethylene glycol sulfate added to the electrolyte solution were changed and that 1,2-propanediol sulfate represented by Chemical Formula 5 is used instead of ethylene glycol sulfate as the cyclic sulfate in a different amount.

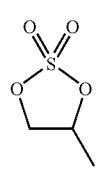

[Chemical Formula 5]

TABLE 1

| | Additive, wt % | |
|---|---|---|
| | Vinylene carbonate | Ethylene glycol sulfate |
| Example 1 | 0.25 | 0.25 |
| Example 2 | 0.25 | 0.50 |
| Example 3 | 0.25 | 1.00 |
| Example 4 | 0.25 | 2.00 |
| Example 5 | 0.50 | 0.25 |
| Example 6 | 0.50 | 0.50 |
| Example 7 | 0.50 | 1.00 |
| Example 8 | 0.50 | 2.00 |
| Example 9 | 1.00 | 0.25 |
| Example 10 | 1.00 | 0.50 |
| Example 11 | 1.00 | 1.00 |
| Example 12 | 1.00 | 2.00 |

TABLE 2

| | Additive, wt % | |
|---|---|---|
| | Vinylene carbonate | 1,2-propanediol sulfate |
| Example 13 | 0.25 | 0.25 |
| Example 14 | 0.25 | 0.50 |
| Example 15 | 0.25 | 1.00 |
| Example 16 | 0.25 | 2.00 |
| Example 17 | 0.50 | 0.25 |
| Example 18 | 0.50 | 0.50 |
| Example 19 | 0.50 | 1.00 |
| Example 20 | 0.50 | 2.00 |
| Example 21 | 1.00 | 0.25 |
| Example 22 | 1.00 | 0.50 |

TABLE 2-continued

| | Additive, wt % | |
|---|---|---|
| | Vinylene carbonate | 1,2-propanediol sulfate |
| Example 23 | 1.00 | 1.00 |
| Example 24 | 1.00 | 2.00 |

TABLE 3

| | Additive, wt % | |
|---|---|---|
| | Vinylene carbonate | Ethylene glycol sulfate |
| Comparative Example 1 | 0.25 | 4.00 |
| Comparative Example 2 | 0.50 | 4.00 |
| Comparative Example 3 | 1.00 | 4.00 |
| Comparative Example 4 | 2.00 | 0.25 |
| Comparative Example 5 | 2.00 | 0.50 |
| Comparative Example 6 | 2.00 | 1.00 |
| Comparative Example 7 | 2.00 | 2.00 |
| Comparative Example 8 | 2.00 | 4.00 |
| Comparative Example 9 | none | none |
| Comparative Example 10 | 0.25 | none |
| Comparative Example 11 | 0.50 | none |
| Comparative Example 12 | 1.00 | none |
| Comparative Example 13 | 2.00 | none |
| Comparative Example 14 | None | 0.25 |
| Comparative Example 15 | None | 0.50 |
| Comparative Example 16 | None | 1.00 |
| Comparative Example 17 | None | 2.00 |
| Comparative Example 18 | None | 4.00 |

TABLE 4

| | Additive, wt % | |
|---|---|---|
| | Vinylene carbonate | 1,2-propanediol sulfate |
| Comparative Example 19 | 0.25 | 4.00 |
| Comparative Example 20 | 0.50 | 4.00 |
| Comparative Example 21 | 1.00 | 4.00 |
| Comparative Example 22 | 2.00 | 0.25 |
| Comparative Example 23 | 2.00 | 0.50 |
| Comparative Example 24 | 2.00 | 1.00 |
| Comparative Example 25 | 2.00 | 2.00 |
| Comparative Example 26 | 2.00 | 4.00 |
| Comparative Example 27 | None | 0.25 |
| Comparative Example 28 | None | 0.50 |
| Comparative Example 29 | None | 1.00 |
| Comparative Example 30 | None | 2.00 |
| Comparative Example 31 | None | 4.00 |

Discharge capacities at 25° C. and at −10° C. were measured respectively for prismatic non-aqueous electrolyte secondary batteries of Examples and Comparative Examples fabricated as described above.

A discharge capacity at each temperature was measured as follows: the battery was charged at a constant current of 600 mA and at a constant voltage of 4.20V for 2.5 hours at 25° C., then the battery was left in a thermostat at 25° C. and −10° C. for 5 hours, and finally, the battery was discharged under the conditions that a discharge current was 600 mA and a final voltage was 3.3 V while keeping the above described temperature. Using the results thus obtained, capacity retention rates were calculated from the following formula.

Capacity retention rate (%)=(Discharge capacity at −10° C./Discharge capacity at 25° C.)×100

Results of testing batteries according to Examples and Comparative Examples are shown in Tables 5, 6, 7 and 8. In Tables 5, 6, 7 and 8, values of the discharge capacity at 25° C. and the capacity retention rate are average values of 12 batteries respectively.

TABLE 5

| | Discharge capacity at 25° C., mAh | Capacity retention rate, % |
|---|---|---|
| Example 1 | 595 | 58 |
| Example 2 | 597 | 62 |
| Example 3 | 596 | 65 |
| Example 4 | 589 | 53 |
| Example 5 | 599 | 61 |
| Example 6 | 599 | 64 |
| Example 7 | 597 | 63 |
| Example 8 | 595 | 52 |
| Example 9 | 598 | 59 |
| Example 10 | 598 | 57 |
| Example 11 | 596 | 55 |
| Example 12 | 595 | 50 |

TABLE 6

| | Discharge capacity at 25° C., mAh | Capacity retention rate, % |
|---|---|---|
| Example 13 | 595 | 58 |
| Example 14 | 596 | 62 |
| Example 15 | 595 | 65 |
| Example 16 | 589 | 54 |
| Example 17 | 599 | 62 |
| Example 18 | 599 | 64 |
| Example 19 | 598 | 64 |
| Example 20 | 596 | 52 |
| Example 21 | 598 | 59 |
| Example 22 | 598 | 57 |
| Example 23 | 597 | 56 |
| Example 24 | 597 | 51 |

TABLE 7

| | Discharge capacity at 25° C., mAh | Capacity retention rate, % |
|---|---|---|
| Comparative Example 1 | 582 | 32 |
| Comparative Example 2 | 584 | 30 |
| Comparative Example 3 | 582 | 29 |
| Comparative Example 4 | 591 | 35 |
| Comparative Example 5 | 592 | 33 |
| Comparative Example 6 | 590 | 31 |
| Comparative Example 7 | 587 | 30 |
| Comparative Example 8 | 569 | 27 |
| Comparative Example 9 | 575 | 31 |
| Comparative Example 10 | 590 | 38 |
| Comparative Example 11 | 598 | 49 |
| Comparative Example 12 | 599 | 47 |
| Comparative Example 13 | 588 | 35 |
| Comparative Example 14 | 588 | 39 |
| Comparative Example 15 | 593 | 46 |
| Comparative Example 16 | 597 | 49 |
| Comparative Example 17 | 595 | 48 |
| Comparative Example 18 | 581 | 33 |

TABLE 8

| | Discharge capacity at 25° C., mAh | Capacity retention rate, % |
|---|---|---|
| Comparative Example 19 | 582 | 33 |
| Comparative Example 20 | 583 | 31 |
| Comparative Example 21 | 585 | 30 |

TABLE 8-continued

|  | Discharge capacity at 25° C., mAh | Capacity retention rate, % |
|---|---|---|
| Comparative Example 22 | 589 | 35 |
| Comparative Example 23 | 591 | 33 |
| Comparative Example 24 | 589 | 31 |
| Comparative Example 25 | 587 | 30 |
| Comparative Example 26 | 570 | 28 |
| Comparative Example 27 | 586 | 38 |
| Comparative Example 28 | 592 | 46 |
| Comparative Example 29 | 597 | 50 |
| Comparative Example 30 | 596 | 49 |
| Comparative Example 31 | 581 | 34 |

As shown in Tables 1 to 8, it was found that the low temperature discharge characteristics were improved when the non-aqueous electrolyte contained vinylene carbonate at a concentration of 1 wt % or less and ethylene glycol sulfate or 1,2-propanediol sulfate at a concentration of 2 wt % or less, compared with Comparative Example 9 in which additives were not used. In addition, the capacity retention rate at a low temperature became larger when the non-aqueous electrolyte contained vinylene carbonate at a concentration of 1 wt % or less and ethylene glycol sulfate or 1,2-propanediol sulfate at a concentration of 2 wt % or less, compared with Comparative Examples 10 to 18 and Comparative Examples 27 to 31 in which either of these two additives was added alone, so that it was possible to obtain low temperature discharge characteristics which could not be achieved when adding only one additive thereto.

When only one of the vinylene carbonate derivatives and cyclic sulfates was used in a trace amount, an SEI film favorable for a negative active material was formed and the low temperature discharge characteristics were slightly improved. However, addition of an increased amount of the derivative resulted in a thicker SEI film and consequently a lithium ion conductivity is lowered, so that the low temperature discharge characteristics were never improved largely. By contrast, the non-aqueous electrolyte secondary battery according to the present invention provided extremely excellent discharge characteristics at a low temperature by using the above described electrolyte. Although the reasons are not apparent, it is believed that a film over the negative active material obtained by mixing 1 wt % or less of vinylene carbonate derivative and 2 wt % or less of cyclic sulfate is different from a film obtained by using the derivative alone, so that decomposition of the non-aqueous electrolyte may be effectively suppressed and a film having a high lithium ion conductivity may be formed.

In the above Examples and Comparative Examples, a mixture of EC and EMC was used for a solvent of the electrolyte solution. However, the same results as described above are obtained even when a ratio of a cyclic carbonate to a chain carbonate is changed or when dimethyl carbonate (DMC) or diethyl carbonate (DEC) is used as the chain carbonate. Also, the same results as described above are obtained even when propylene carbonate (PC) or γ-butyrolactone (γ-BL) is partly used in addition to EC as a cyclic carbonate and a chain carbonate. Especially, the present invention was effectively achieved when EC was used as the cyclic carbonate and EMC and DEC were used as the chain carbonate or when a mixture of EMC and DEC were used as the chain carbonate.

With respect to the non-aqueous electrolyte secondary battery according to the present invention, vinylene carbonate, 4,5-dimethyl vinylene carbonate, 4,5-diethyl vinylene carbonate, 4,5-dipropyl vinylene carbonate, 4-ethyl-5-methyl vinylene carbonate, 4-ethyl-5-propyl vinylene or the like can be used as the vinylene carbonate derivative. Among others, it is particularly preferable to use vinylene carbonate because of its small molecular weight, and because the same results as described above can be obtained by using a smaller amount of the vinylene carbonate, and the discharge characteristics are largely improved by the vinylene carbonate.

With respect to the non-aqueous electrolyte secondary battery according to the present invention, ethylene glycol sulfate, 1,2-propanediol sulfate, 1,3-butanediol sulfate, 2,3-butanediol sulfate or the like can be used as the cyclic sulfate. Among others, it is particularly preferable to use ethylene glycol sulfate or 1,2-propanediol sulfate because of its small molecular weight, and because, the same results as described above can be obtained by using a smaller amount of such ester, and the discharge characteristics are largely improved by such ester.

With respect to the non-aqueous electrolyte secondary battery according to the present invention, whose discharge characteristics at a low temperature is extremely improved, it is preferable that a concentration of at least one of the vinylene carbonate derivatives contained in the electrolyte is 0.25 wt % or more and 1.00 wt % or less, and more preferably 0.25 wt % or more and 0.50 wt % or less.

With respect to the non-aqueous electrolyte secondary battery according to the present invention, whose discharge characteristics at a low temperature is extremely improved, it is preferable that a concentration of at least one of the cyclic sulfates contained in the electrolyte is 0.25 wt % or more and 2.00 wt % or less, and more preferably 0.25 wt % or more and 1.00 wt % or less.

As a non-aqueous electrolyte of the non-aqueous electrolyte secondary battery according to the present invention, any of electrolyte solutions and solid electrolytes can be used. When using an electrolyte solution, any one of non-aqueous solvents such as ethylene carbonate, propylene carbonate, butylene carbonate, trifluoropropylene carbonate, γ-butyrolactone, sulfolan, 1,2-dimethoxyethane, 1,2-diethoxyethane, tetrahydrofran, 2-methyltetrahydrofuran, methyl acetate, ethyl acetate, butyl acetate, methyl propionate, ethyl propionate, butyl propionate, dimethyl carbonate, diethyl carbonate, ethylmethyl carbonate, dipropyl carbonate, methylpropyl carbonate, dibutyl carbonate and the like or a mixture thereof can be used as a solvent of the electrolyte solution.

For the purpose of preventing the battery from breaking when the battery is overcharged, anon-aqueous electrolyte may contain aromatic compounds such as biphenyl, alkyl biphenyls, alkenyl biphenyls, fluoro biphenyls, cyclohexylbenzene, benzene, fluoro benzenes, alkyl benzenes, alkenyl benzens, naphthalene, alkyl naphthalenes, aklenyl naphthalenes, fluoro naphthalenes, 2,4-difluoroanisole, orthoterphenyl.

As a non-aqueous electrolyte of the non-aqueous electrolyte secondary battery according to the present invention, supporting salt is dissolved in the above described non-aqueous solvent. For example, anyone of salt such as LiClO$_4$, LiPF$_6$, LiBF$_4$, LiAsF$_6$, LiCF$_3$CO$_2$, LiCF$_3$SO$_3$, LiCF$_3$CF$_2$SO$_3$, LiCF$_3$CF$_2$CF$_2$SO$_3$, LiN(SO$_2$CF$_3$)$_2$, LiN(SO$_2$CF$_2$CF$_3$)$_2$, LiN(COCF$_3$)$_2$, LiN(COCF$_2$CF$_3$)$_2$, and LiPF$_3$(CF$_2$CF$_3$)$_3$ or a mixture thereof can be used as the supporting salt. Among others, it is particularly preferable that any one of LiPF$_6$ and LiBF$_4$ or a mixture thereof is used, because it is low-cost and provides good discharge characteristics, storage characteristics, and safety.

As a positive active material, it is possible to use a complex oxide represented by a compositional formula such as Li$_x$MO$_2$ or Li$_y$M$_2$O$_4$ or a compositional formula Na$_x$MO$_2$ (where M is one or more transitional metal, $0 \leq x \leq 1$, $0 \leq y \leq 2$), or a metal chalcogen oxide or metal oxide having a tunnel structure or layer structure. The illustrative examples include LiCoO$_2$, LiCo$_x$Ni$_{1-x}$O$_2$, LiMn$_2$O$_4$, Li$_2$Mn$_2$O$_4$, MnO$_2$, FeO$_2$, V$_2$O$_5$, V$_6$O$_{13}$, TiO$_2$, TiS$_2$ or the like. As an organic compound, electroconductive polymers such as polyaniline can be used. In addition, the above described various active materials may be mixed with each other, regardless of whether the material is inorganic or organic.

As a compound used for a negative electrode, an alloy of lithium and Al, Si, Pb, Sn, Zn, or Cd, a metal oxide such as LiFe$_2$O$_3$, WO$_2$, MoO$_2$, SiO, or CuO, a carbonaceous material such as graphite or carbon, a lithium nitride such as Li$_3$N, or metallic lithium, or a mixture thereof may also be used. Among others, it is particularly preferable that the carbonaceous material is used, because it provides an excellent cycle life performance and safety.

As a separating member of the non-aqueous electrolyte battery according to the present invention, it is possible to use woven fabric, non-woven fabric, or synthetic resin microporous membranes, and especially, the synthetic resin microporous membranes can preferably be used. Among others, a microporous membrane made of polyethylene or polypropylene or other polyolefin based microporous membranes such as a microporous membrane obtained by mixing polyethylene and polypropylene for example, because of its thickness, strength, and resistance thereof for example.

If a solid electrolyte such as a polymeric solid electrolyte is used, the solid electrolyte can also be used as a separator. In this case, a porous polymeric solid electrolyte can be used as the polymeric solid electrolyte and the polymeric solid electrolyte may also contain an electrolyte solution. If a gel-like porous polymeric solid electrolyte is used, an electrolyte which comprises the gel may be different from an electrolyte which is contained in the micro pores or the like. When using such a polymeric solid electrolyte, a vinylene carbonate derivative and a cyclic sulfate according to the present invention may be added to the electrolyte. Further, it is possible to combine the synthetic resin microporous membrane with the polymeric solid electrolyte or the like.

A shape of the battery is not particularly limited, and the present invention is applicable to non-aqueous electrolyte secondary batteries having various shapes such as prismatic, elliptic, coin-like, button-like, and sheet-like shapes.

What is claimed is:

1. A non-aqueous electrolyte secondary battery comprising a non-aqueous electrolyte which contains at least one of vinylene carbonate derivatives represented by Chemical Formula 1 at a concentration of 0.25 to 1 wt % and at least one of cyclic sulfates represented by Chemical Formula 2 at a concentration of 0.25 to 2 wt %, wherein said concentrations are expressed with ratios to a total amount of said non-aqueous electrolyte, wherein each of R1 to R8 is any one of a hydrogen atom, alkyl groups, alkoxy groups, halogens, haloalkyl groups, and aryl groups and n is 0 or 1, wherein Chemical Formula 1 is:

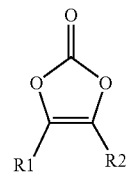

and Chemical Formula 2 is:

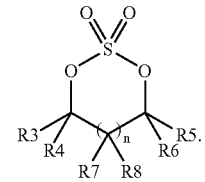

2. The non-aqueous electrolyte secondary battery according to claim 1, wherein said non-aqueous electrolyte comprises ethylene carbonate.

3. The non-aqueous electrolyte secondary battery according to claim 1, wherein said vinylene carbonate derivative is vinylene carbonate.

4. The non-aqueous electrolyte secondary battery according to claim 1, wherein said cyclic sulfate of Chemical Formula 2 is ethylene glycol cyclic sulfate.

5. The non-aqueous electrolyte secondary battery according to claim 1, wherein said cyclic sulfate of Chemical Formula 2 is 1,2-propanediol cyclic sulfate.

6. The non-aqueous electrolyte secondary battery according to claim 1, principally comprising a carbonaceous material as a negative active material.

7. The non-aqueous electrolyte secondary battery according to claim 1, wherein said non-aqueous electrolyte comprises LiPF$_6$.

8. The non-aqueous electrolyte secondary battery according to claim 1, wherein said non-aqueous electrolyte comprises a chain carbonate.

9. A method for producing a non-aqueous electrolyte secondary battery, wherein an electrode is brought into contact with a non-aqueous electrolyte which contains at least one of vinylene carbonate derivatives represented by Chemical Formula 1 at a concentration of 0.25 to 1 wt % and at least one of cyclic sulfates represented by Chemical Formula 2 at a concentration of 0.25 to 2 wt %, at least at a certain time during a period from when the electrolyte is initially brought into contact with the electrode to when the electrolyte can not be added because the battery case is completely sealed, wherein said concentrations are expressed with ratios to a total amount of said non-aqueous electrolyte, wherein each of R1 to R8 is any one of a hydrogen atom, alkyl groups, alkoxy groups, halogens, haloalkyl groups, and aryl groups and n is 0 or 1, wherein Chemical Formula 1 is:

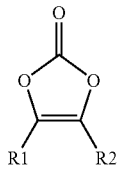

and Chemical Formula 2 is:

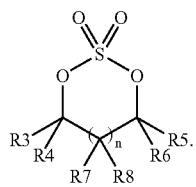

10. The method for producing a non-aqueous electrolyte secondary battery according to claim 9, wherein said non-aqueous electrolyte comprises ethylene carbonate.

11. The method for producing a non-aqueous electrolyte secondary battery according to claim 9, wherein said vinylene carbonate derivative is vinylene carbonate.

12. The method for producing a non-aqueous electrolyte secondary battery according to claim 9, wherein said cyclic sulfate of Chemical Formula 2 is ethylene glycol cyclic sulfate.

13. The method for producing a non-aqueous electrolyte secondary battery according to claim 9, wherein said cyclic sulfate of Chemical Formula 2 is 1,2-propanediol cyclic sulfate.

14. The method for producing a non-aqueous electrolyte secondary battery according to claim 9, wherein said non-aqueous electrolyte secondary battery principally comprises a carbonaceous material as a negative active material.

15. The method for producing a non-aqueous electrolyte secondary battery according to claim 9, wherein said non-aqueous electrolyte comprises $LiPF_6$.

16. The method for producing a non-aqueous electrolyte secondary battery according to claim 9, wherein said non-aqueous electrolyte comprises a chain carbonate.

* * * * *